US008816973B2

(12) United States Patent
Mizuhashi et al.

(10) Patent No.: US 8,816,973 B2
(45) Date of Patent: Aug. 26, 2014

(54) POSITION DETECTION APPARATUS, DISPLAY APPARATUS AND ELECTRONIC APPARATUS

(75) Inventors: Hiroshi Mizuhashi, Kanagawa (JP); Kohei Azumi, Tokyo (JP)

(73) Assignee: Japan Display West Inc., Aichi-Ken (JP)

( * ) Notice: Subject to any disclaimer, the term of this patent is extended or adjusted under 35 U.S.C. 154(b) by 201 days.

(21) Appl. No.: 13/067,965

(22) Filed: Jul. 12, 2011

(65) Prior Publication Data

US 2012/0044196 A1 Feb. 23, 2012

(30) Foreign Application Priority Data

Aug. 20, 2010 (JP) ................................. 2010-185132

(51) Int. Cl.
G06F 3/041 (2006.01)
G06F 1/32 (2006.01)
G06F 3/044 (2006.01)

(52) U.S. Cl.
CPC G06F 3/044 (2013.01); G06F 1/32 (2013.01); G06F 2203/04101 (2013.01); G06F 3/0416 (2013.01)
USPC .......................................... 345/173; 345/156

(58) Field of Classification Search
None
See application file for complete search history.

(56) References Cited

U.S. PATENT DOCUMENTS

2006/0279498 A1* 12/2006 Kaneda et al. .................. 345/89
2008/0122798 A1* 5/2008 Koshiyama et al. .......... 345/173
2009/0189867 A1* 7/2009 Krah et al. .................... 345/173

FOREIGN PATENT DOCUMENTS

| JP | 2005-275644 | 10/2005 |
| JP | 2006-023904 | 1/2006 |
| JP | 2008-117371 | 5/2008 |

OTHER PUBLICATIONS

Fairchild Semiconductor—1975—CMOS Schmitt Trigger—Application Note.*

* cited by examiner

Primary Examiner — Quan-Zhen Wang
Assistant Examiner — Chad Dicke
(74) Attorney, Agent, or Firm — Rader, Fishman & Grauer PLLC

(57) ABSTRACT

Disclosed herein is a position detection apparatus including: a sensor section having a plurality of detection electrodes laid out on a detection surface; a select section configured to select one or more detection electrodes from the detection electrodes; an oscillation section having an oscillation frequency determined by a capacitance generated in the one or more detection electrodes selected by the select section; a conversion section configured to output an output signal representing the frequency of an oscillation signal generated by the oscillation section; and a control section configured to change the frequency of the oscillation signal generated by the oscillation section in accordance with the output signal output by the conversion section.

3 Claims, 13 Drawing Sheets

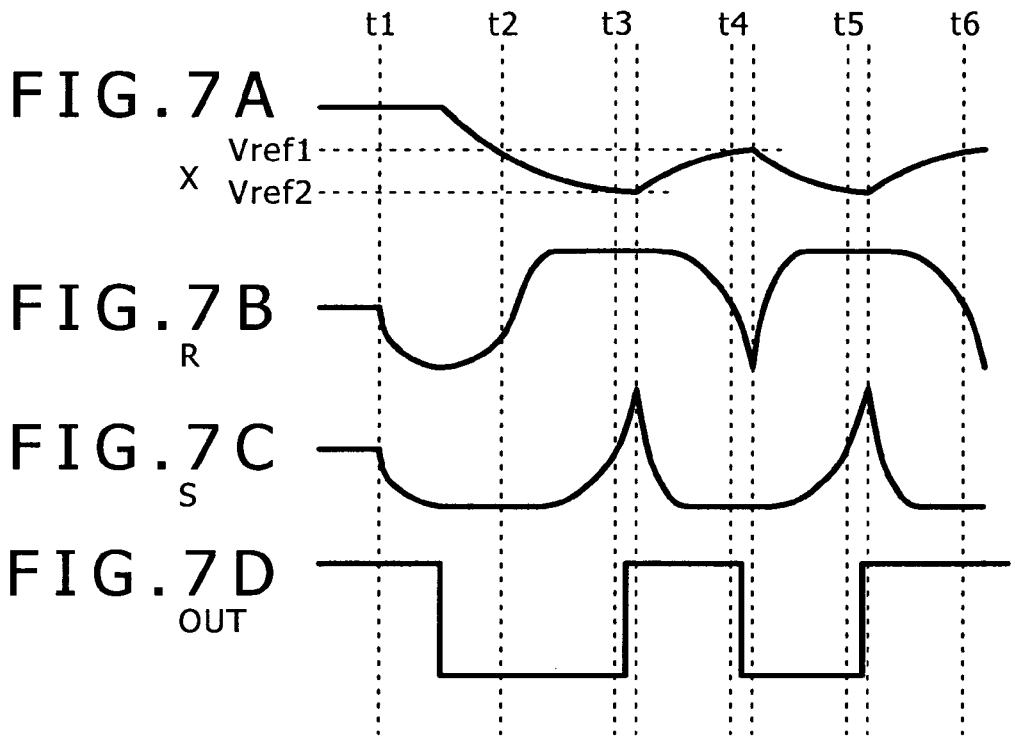
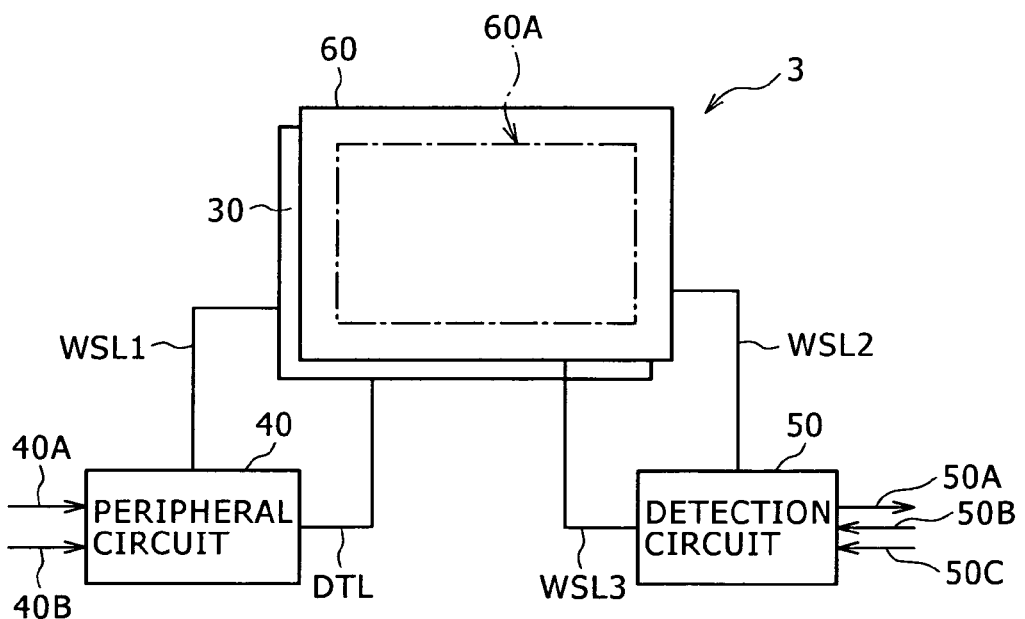

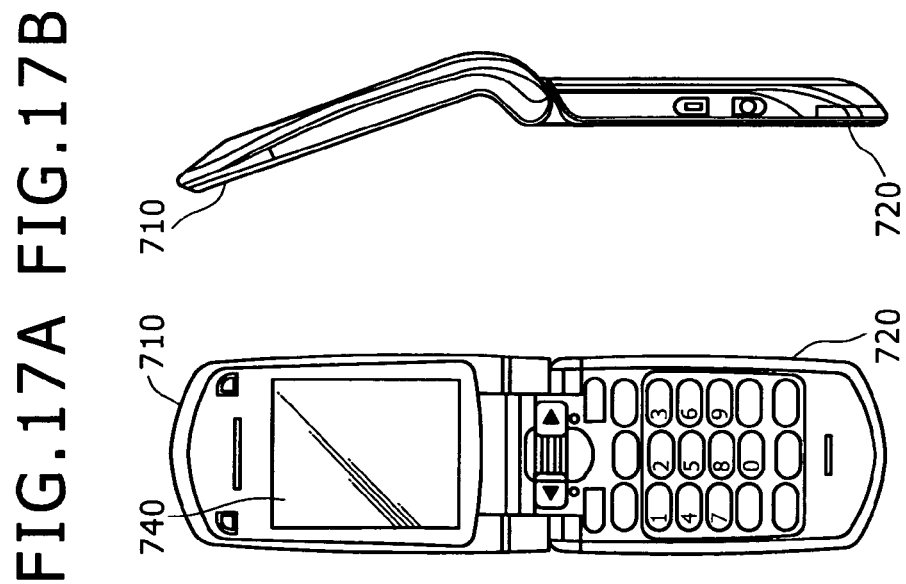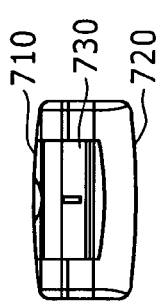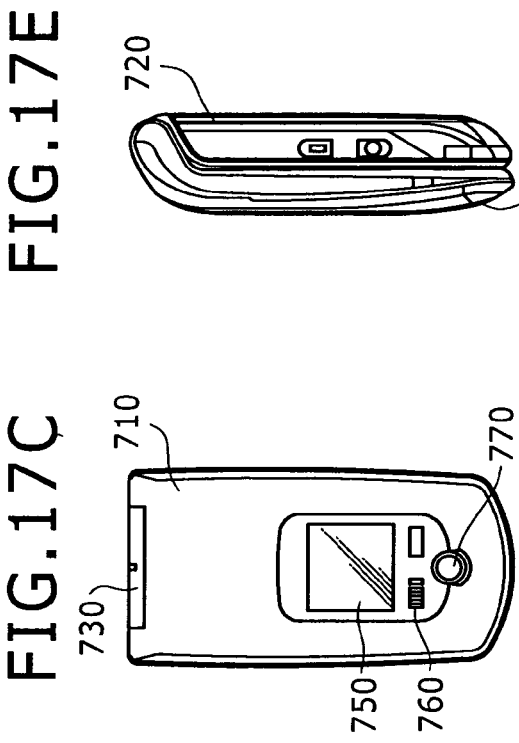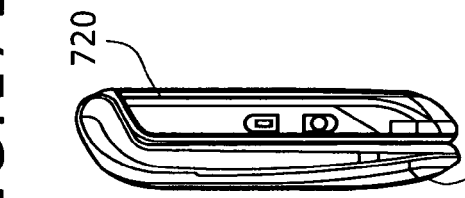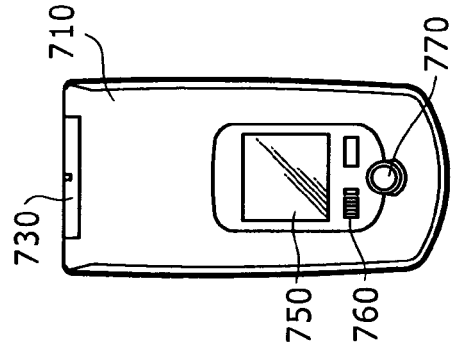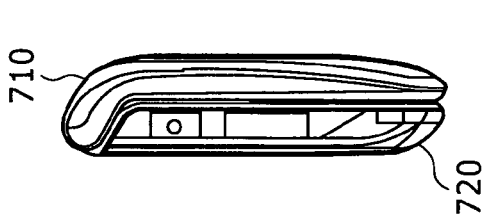

POSITION DETECTION APPARATUS, DISPLAY APPARATUS AND ELECTRONIC APPARATUS

BACKGROUND

The present disclosure relates to a position detection apparatus for detecting a position located on a detection surface as a position touched by an object of detection, the spatial position of the object separated away from the detection surface and a movement made by the object over the detection surface. By the object, a finger, a hand, an arm, a pen or the like is implied. In the following description, the object is also referred to as a 'finger or the like.'

In addition, the present disclosure relates a display apparatus, which employs the position detection apparatus, and an electronic apparatus having such a display apparatus.

In the past, there have been known existing technologies for inputting information on a position touched by a finger or the like. The existing technologies include a special technology drawing attention in particular. In accordance with the special technology, there is provided a display apparatus capable of inputting information on the position of a button touched by a finger or the like as one of a variety of buttons appearing on a display screen in the same way as an operation to input information on the position of an ordinary button when the ordinary button is touched by the finger or the like. For more information on this special technology, the reader is advised to refer to Japanese Patent Laid-Open Nos. 2005-275644 and 2006-23904. By virtue of this special technology, the ordinary buttons can each be integrated in the display apparatus as a button displayed on the display screen, giving big merits that it is possible to reduce the space, which is occupied by the ordinary buttons and the display apparatus, as well as the number of components.

There are a variety of types of touch sensor for detecting a touch of a finger or the like. A typical example of a generally popular touch sensor is a sensor of an electrostatic-capacitance type. For more information on this sensor of the electrostatic-capacitance type, the reader is advised to refer to Japanese Patent Laid-Open No. 2006-23904. When a finger or the like is brought into contact with a touch panel, an electric field generated on the surface of the touch panel changes and can be detected as a change of the frequency of a current flowing to a detection electrode. Then, the sensor of the electrostatic-capacitance type detects the touch of the finger or the like as a change of the frequency.

That is to say, in accordance with the touch detection method described above, a change of an electric field generated on the surface of a touch panel is detected as a change of the frequency of a current flowing to a detection electrode. Thus, a finger or the like needs to be brought into contact with the surface of the touch panel or brought to a position sufficiently close to the surface. If the finger or the like is placed at a position far away from the surface of the touch panel or, to be more specific, if the finger or the like is placed at a position far away from the surface of the touch panel by a distance of 1 cm or a longer distance, no information is supplied to the touch panel. As described in Japanese Patent Laid-Open No. 2008-117371, however, even if the finger or the like is placed at a position far away from the surface of the touch panel, information can be supplied to the touch panel by for example changing the interval between detection electrodes adjacent to each other in accordance with the spatial position of the object which is the finger or the like. In accordance with Japanese Patent Laid-Open No. 2008-117371, the interval between detection electrodes adjacent to each other is changed by reducing the number of scanning detection electrodes.

SUMMARY

By the way, in accordance with the position detection method described above, in order to be able to detect a finger or the like separated away from the surface of a touch panel, it is desirable to set the frequency of a current flowing to a detection electrode at a large value. However, even a low frequency of a current flowing to a detection electrode can actually be used to detect a finger or the like in close proximity to the surface of the touch panel. Thus, there is raised a problem that, in an operation to detect a finger or the like in close proximity to the surface of the touch panel by making use of a high frequency of a current flowing to a detection electrode, the electric power is consumed wastefully.

It is thus an aim of the present disclosure addressing the problem described above to provide a position detection apparatus capable of reducing the amount of power consumed wastefully, a display apparatus employing the position detection apparatus and an electronic apparatus having the display apparatus.

A position detection apparatus according to the present disclosure employs:

a sensor section having a plurality of detection electrodes laid out on a detection surface;

a select section configured to select one or more detection electrodes from the detection electrodes; and an oscillation section having an oscillation frequency determined by a capacitance generated in the one or more detection electrodes selected by the select section.

The position detection apparatus further includes:

a conversion section configured to output an output signal representing the frequency of an oscillation signal generated by the oscillation section; and a control section configured to change the frequency of the oscillation signal generated by the oscillation section in accordance with the output signal output by the conversion section.

A display apparatus according to the present disclosure employs a display panel, which is used for displaying an image on a display surface on the basis of a video signal, and the position detection apparatus described above. On the other hand, an electronic apparatus according to the present disclosure employs the display apparatus.

To put it concretely, the display apparatus employs:

the display panel;

a sensor section having a plurality of detection electrodes laid out on the display surface;

a select section configured to select one or more detection electrodes from the detection electrodes; and an oscillation section having an oscillation frequency determined by a capacitance generated in the one or more detection electrodes selected by the select section.

The display apparatus further includes:

a conversion section configured to output an output signal representing the frequency of an oscillation signal generated by the oscillation section; and a control section configured to change the frequency of the oscillation signal generated by the oscillation section in accordance with the output signal output by the conversion section.

In the position detection apparatus, the display apparatus and the electronic apparatus, the control section has a plurality of threshold values for the output signal output by the conversion section. It is possible to provide a configuration in which, when the output signal output by the conversion section exceeds one of the threshold values, the frequency of the oscillation section is changed. In addition, in accordance with the present disclosure, the oscillation section may be configured to include a signal source and a variable-resistance resistor. In this case, it is possible to provide a configuration in which the control section outputs a control signal to the variable-resistance resistor in order to change the resistance of the variable-resistance resistor and, hence, change the frequency of the oscillation signal generated by the oscillation section.

In the position detection apparatus, the display apparatus and the electronic apparatus, the control section changes the frequency of the oscillation signal generated by the oscillation section in accordance with the output signal output by the conversion section. When the finger or the like is detected at a position far away from the surface for example, the frequency of a current flowing to the detection apparatus is set at a large value. When the finger or the like is detected at a position in close proximity to the surface, on the other hand, the frequency of a current flowing to the detection apparatus is set at a small value. In this way, the frequency of the oscillation signal generated by the oscillation section is adjusted in accordance with the detected position of the finger or the like.

In accordance with the position detection apparatus, the display apparatus and the electronic apparatus which are provided by the present disclosure, the frequency of the oscillation signal generated by the oscillation section is adjusted in accordance with the detected position of the finger or the like. Thus, it is possible to reduce the amount of power consumed when the finger or the like is placed at a position at which the finger or the like can be detected without increasing the frequency of the oscillation signal generated by the oscillation section. As a result, the amount of wastefully consumed power can be reduced.

BRIEF DESCRIPTION OF THE DRAWINGS

FIGS. 7A to 7D are diagrams showing waveforms of signals generated in the operations carried out by the signal source shown in FIG. 5;

FIG. 8 is a diagram showing a typical configuration of a display apparatus according to a second embodiment of the present disclosure;

FIG. 17A is a front-view diagram showing an opened state of a fifth typical host apparatus in which the display apparatus according to the embodiments or the like is employed, and FIG. 17B is a side-view diagram showing the opened state of the fifth typical host apparatus, FIG. 17C is a front-view diagram showing a closed state of the fifth typical host apparatus, FIG. 17D is a left-side-view diagram showing the closed state of the fifth typical host apparatus seen from the left-hand side, FIG. 17E is a right-side-view diagram showing the closed state of the fifth typical host apparatus seen from the right-hand side, FIG. 17F is an upper-side-view diagram showing the closed state of the fifth typical host apparatus seen from the upper side, and FIG. 17G is a lower-side-view diagram showing the closed state of the fifth typical host apparatus seen from the lower side.

DETAILED DESCRIPTION OF THE PREFERRED EMBODIMENTS

Embodiments of the present disclosure are described below in detail by referring to the diagrams. It is to be noted that the embodiments are explained in the following order.
1: Basic Principles of Contact Detection and Proximity Detection (FIG. 1)
2: First Embodiment (FIGS. 2 to 7)
  Typical configuration including a liquid-crystal display panel and a touch panel which are separated from each other
3: Second Embodiment (FIGS. 8 and 9)
  Typical configuration including a liquid-crystal display panel and a touch panel which are integrated with each other
4: Modifications (FIGS. 10 to 12)
  Other examples of a switching device in a select section
  Other examples of the connection between the select section and a sensor section
5: Typical Host Apparatus (FIGS. 13 to 17G)

1: Basic Principles of Contact Detection and Proximity Detection (FIG. 1)

First of all, the following description explains basic principles of contact detection and proximity detection which are carried out by display apparatus according to embodiments. FIG. 1 is a diagram showing a typical configuration of a position detection apparatus 100 capable of carrying out the contact detection and the proximity detection.

Figure 1:
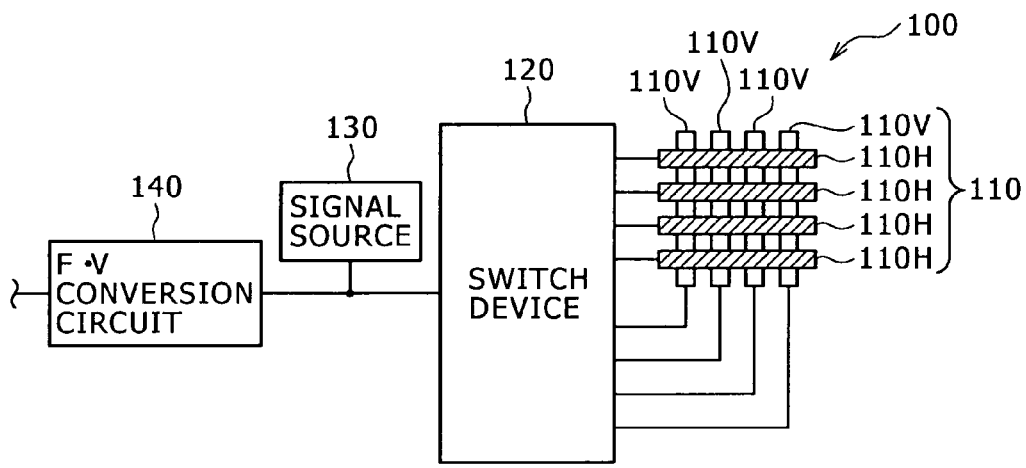
FIG. 1 is a diagram showing a typical configuration of a position detection apparatus capable of carrying out contact detection and proximity detection.

The position detection apparatus 100 is an electrostatic-capacitance position detection apparatus having electrodes 110 typically arranged to form a 2-dimensional layout as shown in FIG. 1. The 2-dimensionally arranged electrodes 110 are created on a detection surface not shown in the figure. Typically, the 2-dimensionally arranged electrodes 110 are configured to include a plurality of horizontal detection electrodes 110H and a plurality of vertical detection electrodes 110V. The horizontal detection electrodes 110H are each stretched in the horizontal direction on the detection surface and are laid out at predetermined intervals separating the horizontal detection electrodes 110H from each other in the vertical direction. On the other hand, the vertical detection electrodes 110V are each stretched in the vertical direction on a detection surface parallel to the detection surface, on which the horizontal detection electrodes 110H are stretched and laid out, and are laid out at predetermined intervals separating the vertical detection electrodes 110V from each other in the horizontal direction.

In addition to the 2-dimensionally arranged electrodes 110, the position detection apparatus 100 also has a switch device 120, a signal source 130 and an F-V (frequency-to-voltage) conversion circuit 140. The switch device 120 is a device for changing one of the 2-dimensionally arranged electrodes 110 to another. The signal source 130 is a source for supplying an AC (alternating-current) signal to the 2-dimensionally arranged electrodes 110. The switch device 120 is typically a multiplexer. The switch device 120 has a plurality of terminals on one side of the multiplexer. Each of the terminals is connected to an end of one of the horizontal detection electrodes 110H or an end of one of the vertical detection electrodes 110V. The switch device 120 has another terminal on the other side of the multiplexer. This other terminal is connected to the signal source 130 and the F-V conversion circuit 140.

For example, the switch device 120 employed in the position detection apparatus 100 selects one of the horizontal detection electrodes 110H sequentially one after another and selects one of the vertical detection electrodes 110V sequentially one after another. Thus, a signal generated by the signal source 130 is applied to the selected ones of the horizontal detection electrodes 110H sequentially one after another and applied to the selected ones of the vertical detection electrodes 110V sequentially one after another. In addition, for example, the switch device 120 employed in the position detection apparatus 100 may also select one of only predetermined horizontal detection electrodes 110H sequentially one after another and select one of only predetermined vertical detection electrodes 110V sequentially one after another.

At that time, when a finger or the like is brought into contact with the detection surface of the 2-dimensionally arranged electrodes 110 or approaches the detection surface, a surface electric field generated on the detection surface varies, changing the frequency of a current flowing to the 2-dimensionally arranged electrodes 110. The change of the frequency is converted by the F-V conversion circuit 140 into a change of a voltage. By evaluating the change of the voltage, it is possible to detect a position located on detection surface as a position touched by the finger or the like, a spatial position separated away from the detection surface as the spatial position of the finger or the like and a movement made by the finger or the like over the detection surface. It is to be noted that the finger or the like is not shown in the figure.

2: First Embodiment

Figure 2:
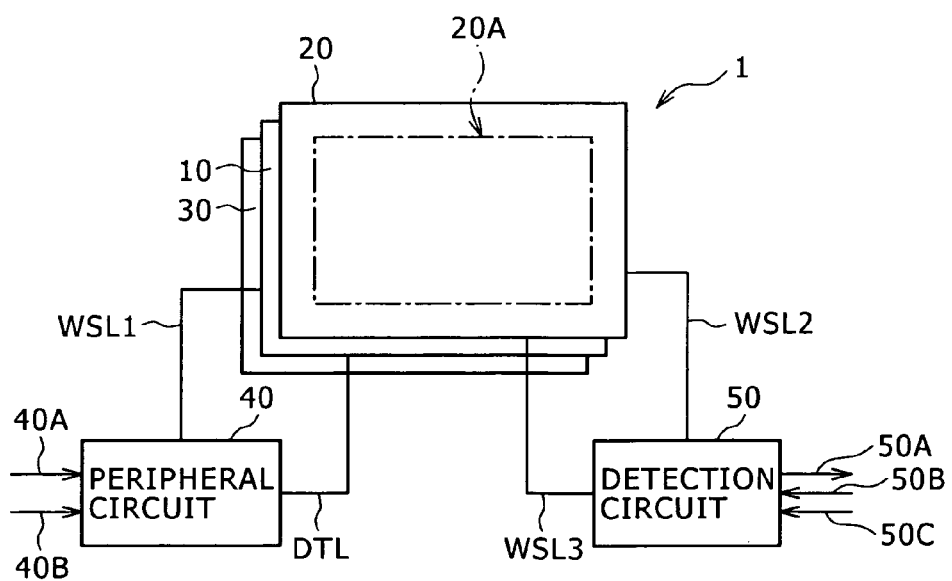
FIG. 2 is a diagram showing a typical configuration of a display apparatus according to a first embodiment of the present disclosure.

FIG. 2 is a diagram showing a typical configuration of a display apparatus 1 according to a first embodiment of the present disclosure. The display apparatus 1 is a display apparatus having a touch sensor (and a proximity sensor). Typically, the display apparatus 1 has a liquid-crystal display device serving as its display device. In addition, the touch sensor (and the proximity sensor) of an electrostatic-capacitance type are provided on the surface of the liquid-crystal display device. The touch sensor (and the proximity sensor) are provided separately from the liquid-crystal display device.

As shown in FIG. 2, the display apparatus 1 employs a liquid-crystal display panel 10, a touch panel 20, a backlight 30, a peripheral circuit 40 and a detection circuit 50. The touch panel 20 is provided on the observer side (or the front side) of the liquid-crystal display panel 10 whereas the backlight 30 is provided on the rear side of the liquid-crystal display panel 10. Liquid-Crystal Display Panel 10

The liquid-crystal display panel 10 is a panel for displaying an image by transmission and modulation of light coming from the backlight 30 serving as a light source by changing an array of liquid-crystal molecules. The liquid-crystal display panel 10 is a transmission-type display panel having a plurality of pixels laid out to form a matrix. The pixels themselves are not shown in the figure. The liquid-crystal display panel 10 is driven by the peripheral circuit 40 in accordance with typically a video signal 40A and a synchronization signal 40B which are supplied to the peripheral circuit 40. The liquid-crystal display panel 10 has a plurality of scan lines WSL1 arranged to form typically rows of the matrix and a plurality of signal lines DTL arranged to form typically columns of the matrix. Each of the pixels are placed at an intersection of one of the scan lines WSL1 and one of signal lines DTL so that the pixels are laid out to form the matrix.
Touch Panel 20

The touch panel 20 is a panel for inputting information when a finger or the like is brought into contact with an image display surface 20A of the touch panel 20 employed in the display apparatus 1, brought to a position in close proximity to the image display surface 20A or moved over the image display surface 20A. The image display surface 20A is the surface of the touch panel 20. The touch panel 20 is typically provided separately from the liquid-crystal display panel 10. For example, the touch panel 20 is pasted on the surface of the liquid-crystal display panel 10 by making use of an adhesive agent not shown in the figure. The touch panel 20 is a typical touch sensor described earlier as a touch sensor having an electrostatic-capacitance type. The touch panel 20 is capable of detecting a state of contact/noncontact with an XY matrix, a spatial position separated away from the matrix and a movement over the matrix.
Backlight 30

The backlight 30 is a section placed behind the liquid-crystal display panel 10 to serve as a section for radiating illumination light to the liquid-crystal display panel 10. Typically, the backlight 30 employs a light guide plate, a light source provided on a side surface of the light guide plate and an optical device provided on the upper surface serving as a light emitting surface of the light guide plate. The backlight 30 has a function to scatter light coming from the light source provided on the side surface in order to make the light uniform. The light source is a source for generating light of a line shape. Typically, the light source is an array of HCFLs (Hot Cathode Fluorescent Lamps), CCFLs (Cold Cathode Fluorescent Lamps) or LEDs (Light Emitting Diodes). The optical device is configured as typically a laminated structure of diffusion plates, diffusion sheets, lens films, polarization separation sheets or the like.

Position Detection Apparatus 2

Figure 3:
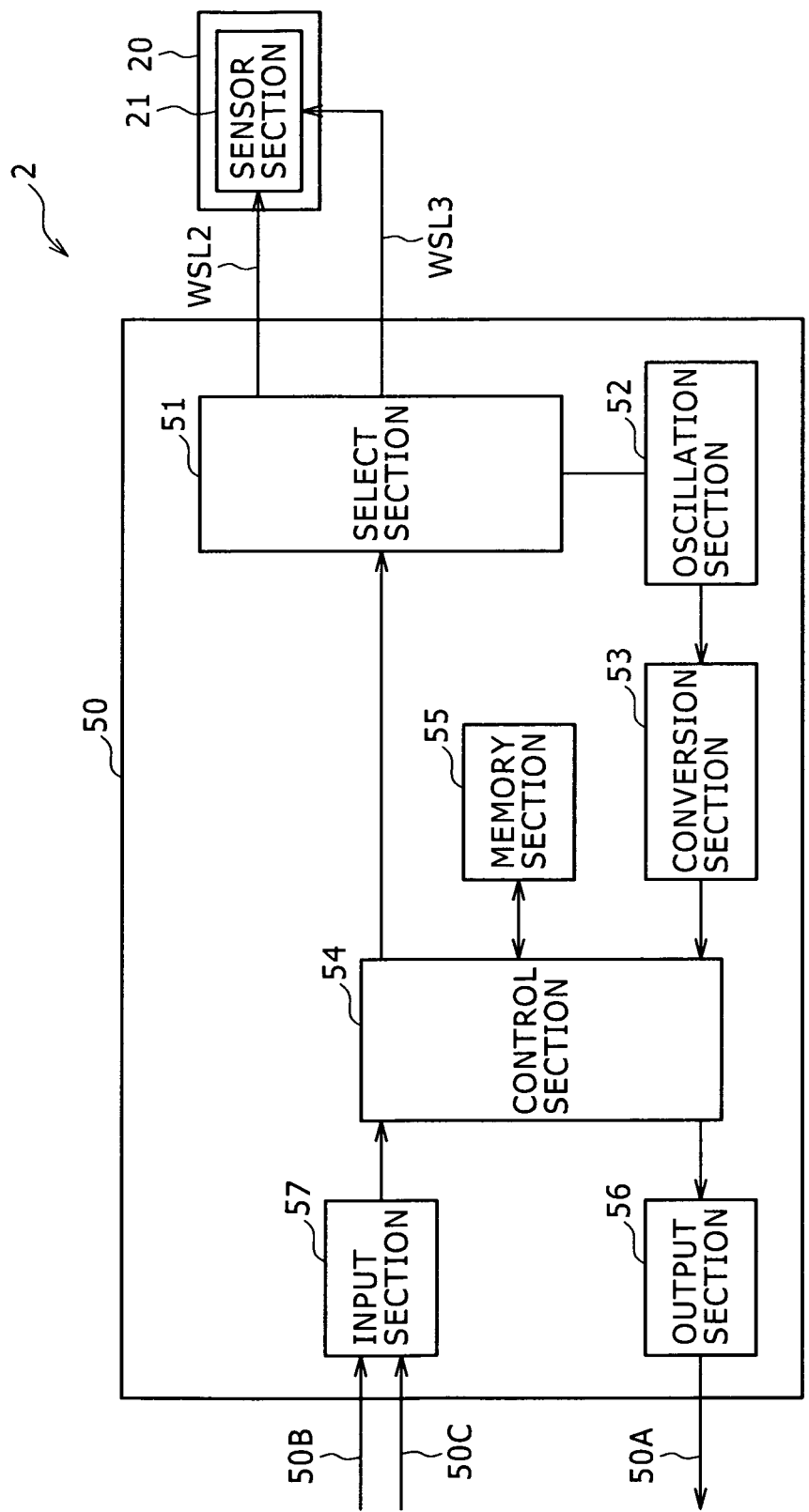
FIG. 3 is a diagram showing a typical configuration of a position detection apparatus employed in the display apparatus shown in FIG. 2.

FIG. 3 is a diagram showing a typical configuration of a position detection apparatus 2 employed in the display apparatus 1 shown in FIG. 2. The position detection apparatus 2 is a section for detecting a state of contact/noncontact with the touch panel 20, a spatial position separated away from the touch panel 20 and a movement over the touch panel 20. The position detection apparatus 2 is a position detection apparatus capable of carrying out contact and proximity detections in the same way as the position detection apparatus 100 shown in FIG. 1. As shown in FIG. 3, the position detection apparatus 2 is typically configured to include the touch panel 20 and a detection circuit 50. The touch panel 20 typically has a sensor section 21. On the other hand, the detection circuit 50 is configured to include typically a select section 51, an oscillation section 52, a conversion section 53, a control section 54, a memory section 55, an output section 56 and an input section 57.

Figure 4:
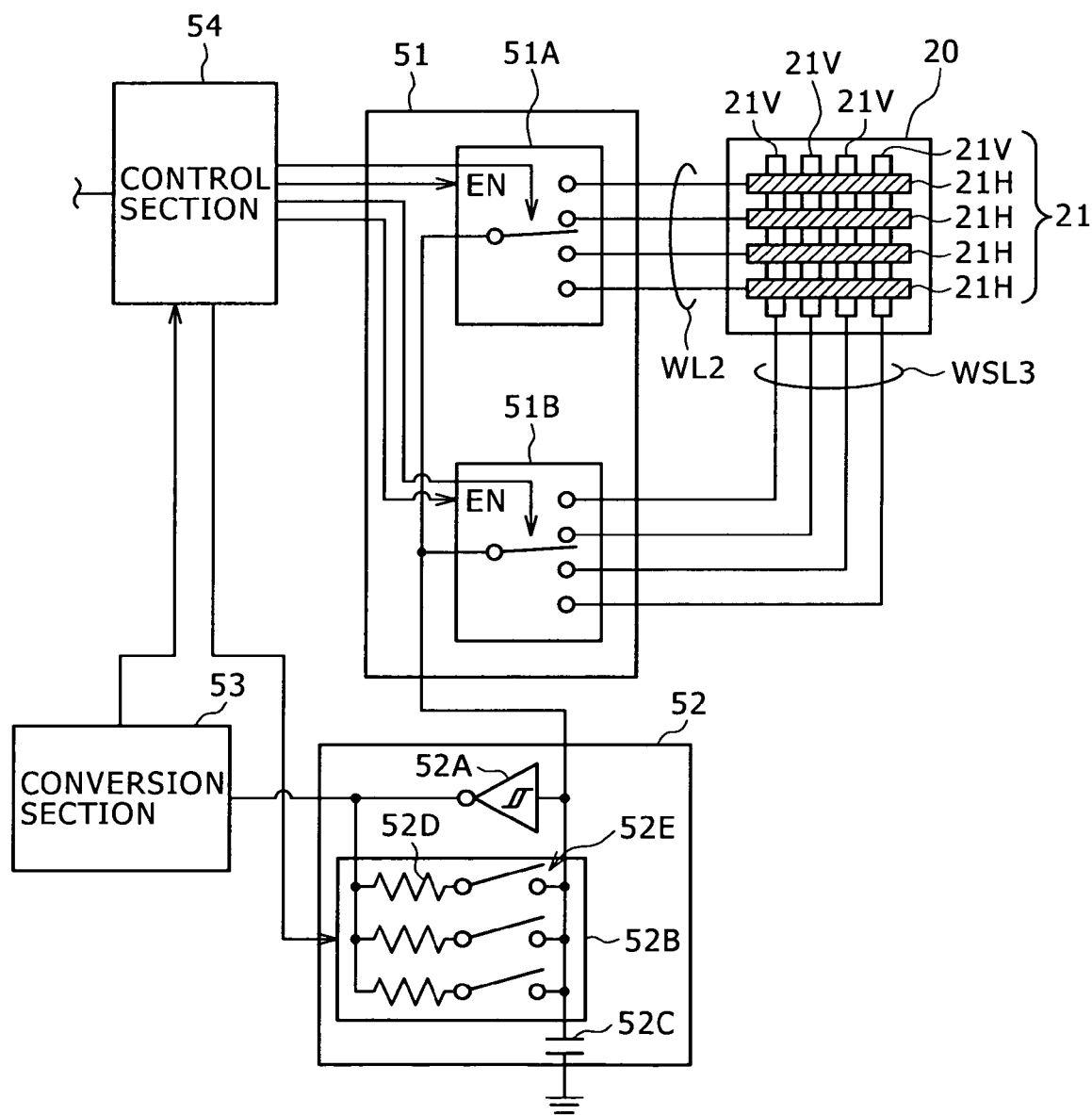
FIG. 4 is a diagram showing a typical internal configuration of the position detection apparatus shown in FIG. 3.

The sensor section 21 detects a finger or the like in order to determine whether the finger or the like is in a state of being brought into contact with the image display surface 20A or a state of noncontact with the image display surface 20A, and detects a spatial position of the finger or the like or a movement of the finger or the like over the image display surface 20A. The sensor section 21 is created on the image display surface 20A serving as a detection surface. Typically, the sensor section 21 has a plurality of horizontal detection electrodes 21H and a plurality of vertical detection electrodes 21V as shown in FIG. 4. The horizontal detection electrodes 21H are each stretched in the horizontal direction on the detection surface and are laid out at predetermined intervals separating the horizontal detection electrodes 21H from each other in the vertical direction. On the other hand, the vertical detection electrodes 21V are each stretched in the vertical direction on a detection surface parallel to the detection surface, on which the horizontal detection electrodes 21H are stretched and laid out, and are laid out at predetermined intervals separating the vertical detection electrodes 21V from each other in the horizontal direction.

The select section 51 electrically connects the oscillation section 52 to the sensor section 21 including the horizontal detection electrodes 21H as well as the vertical detection electrodes 21V and electrically disconnects the oscillation section 52 from the sensor section 21. To put it concretely, the select section 51 selects one or more electrodes from the horizontal detection electrodes 21H and the vertical detection electrodes 21V. Then, the select section 51 connects the oscillation section 52 to the one or more selected horizontal detection electrodes 21H and the one or more selected vertical detection electrodes 21V. The select section 51 has a changeover switching device 51A for changing a horizontal detection electrode 21H to another and a changeover switching device 51B for changing a vertical detection electrode 21V to another. In FIG. 4, four horizontal detection electrodes 21H and four vertical detection electrodes 21V are shown.

The switching devices 51A and 51B are each typically a multiplexer. The changeover switching device 51A has a plurality of terminals on one side of the multiplexer. Each of the terminals is connected by a scan line WSL2 to an end of one of the horizontal detection electrodes 21H. In addition, the changeover switching device 51A has another terminal on the other side of the multiplexer. This other terminal is connected by a line to the oscillation section 52. By the same token, the changeover switching device 51B has a plurality of terminals on one side of the multiplexer. Each of the terminals is connected by a scan line WSL3 to an end of one of the vertical detection electrodes 21V. In addition, the changeover switching device 51B has another terminal on the other side of the multiplexer. This other terminal is connected by a line to the oscillation section 52.

Each of the switching devices 51A and 51B sets the setting of its internal switch in accordance with select and EN (enable) signals received from the control section 54 as described later. With the EN signal put in an active state, each of the switching devices 51A and 51B electrically connects a selected terminal on the side of the sensor section 21 to the terminal on a side opposite to the side of the sensor section 21. The selected terminal is a terminal selected by the select signal from a plurality of terminals on the side of the sensor section 21. With the EN signal put in an inactive state, on the other hand, each of the switching devices 51A and 51B electrically disconnects all terminals on the side of the sensor section 21 from the terminal on a side opposite to the side of the sensor section 21.

The oscillation section 52 determines its oscillation frequency in accordance with a capacitance generated in one or more horizontal and vertical detection electrodes 21H and 21V selected by the select section 51. The oscillation section 52 is configured to include typically a signal source 52A for generating an AC signal and a variable-resistance resistive device 52B connected in parallel to the signal source 52A. The configuration of the oscillation section 52 also includes a capacitive device 52C connected to a connection point which connects the signal source 52A to the variable-resistance resistive device 52B and is connected to the select section 51.

Figure 5:
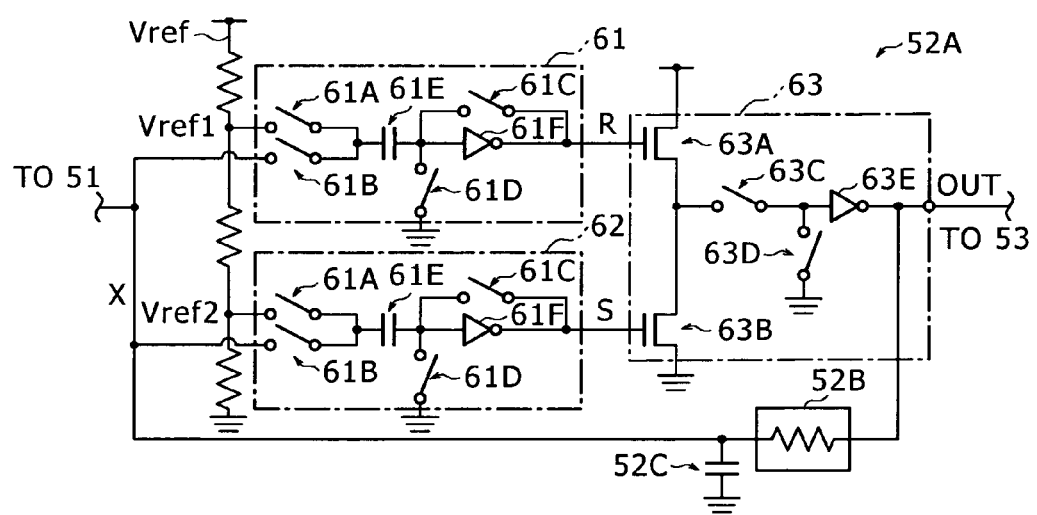
FIG. 5 is a diagram showing a typical internal configuration of a signal source employed in the position detection apparatus shown in FIG. 4.

The signal source 52A is configured to include a first waveform generation circuit 61, a second waveform generation circuit 62 and a third waveform generation circuit 63 as shown in FIG. 5. Each of the first waveform generation circuit 61, the second waveform generation circuit 62 and the third waveform generation circuit 63 is configured as a circuit having two input terminals and one output terminal. One of the two input terminals of the first waveform generation circuit 61 receives an electric potential generated at a connection point Vref1 from an electric potential appearing on a reference voltage line Lref whereas the other input terminal is connected to the output terminal OUT of the third waveform generation circuit 63 by the variable-resistance resistive device 52B. The output terminal R of the first waveform generation circuit 61 is connected to one of the two input terminals of the third waveform generation circuit 63. On the other hand, one of the two input terminals of the second waveform generation circuit 62 receives an electric potential generated at a connection point Vref2 from the electric potential appearing on the reference voltage line Lref whereas the other input terminal is connected to the output terminal OUT of the third waveform generation circuit 63 by the variable-resistance resistive device 52B. The output terminal S of the second waveform generation circuit 62 is connected to the other input terminal of the third waveform generation circuit 63. The electric potential generated at the connection point Vref2 is lower than the electric potential generated at the connection point Vref1.

As shown in FIG. 5, each of the first waveform generation circuit 61 and the second waveform generation circuit 62 is configured to include typically four switch devices 61A to 61D, a capacitive device 61E and a comparator 61F. The input terminal of the switch device 61A is connected to the connection point Vref1 whereas the input terminal of the switch device 61B is connected to the output terminal OUT of the third waveform generation circuit 63 by the variable-resistance resistive device 52B. The output terminals of the two switch devices 61A and 61B are connected to the input terminal of the capacitive device 61E whereas the output terminal of the capacitive device 61E is connected to the input terminal of the comparator 61F. The output, terminal of the comparator 61F of the first waveform generation circuit 61 is the output terminal R of the first waveform generation circuit 61. The output terminal of the comparator 61F of the first waveform generation circuit 61 is connected to one of the input terminals of the third waveform generation circuit 63. To be more specific, the output terminal of the comparator 61F of the first waveform generation circuit 61 is connected to the gate electrode of a transistor 63A employed in the third waveform generation circuit 63 as described later. On the other hand, the output terminal of the comparator 61F of the second waveform generation circuit 62 is the output terminal S of the second waveform generation circuit 62. The output terminal of the comparator 61F of the second waveform generation circuit 62 is connected to the other input terminal of the third waveform generation circuit 63. To be more specific, the output terminal of the comparator 61F of the second waveform generation circuit 62 is connected to the gate electrode of a transistor 63B employed in the third waveform generation circuit 63 as described later. The switch device 61C is connected in parallel to the comparator 61F. The switch device 61D is connected between the input terminal of the comparator 61F and a low-voltage line such as the ground line.

As shown in FIG. 5, the third waveform generation circuit 63 is configured to include typically two transistors 63A and 63B, two switch devices 63C and 63D and a comparator 63E. The gate electrode of the transistor 63A is one of the input terminals of the third waveform generation circuit 63. The gate electrode of the transistor 63A is connected to the output terminal R of the first waveform generation circuit 61. The output terminal R of the first waveform generation circuit 61 is the output terminal of the comparator 61F employed in the first waveform generation circuit 61. On the other hand, the gate electrode of the transistor 63B is the other input terminal of the third waveform generation circuit 63. The gate electrode of the transistor 63B is connected to the output terminal S of the second waveform generation circuit 62. The output terminal S of the second waveform generation circuit 62 is the output terminal of the comparator 61F employed in the second waveform generation circuit 62. The source or drain electrode of the transistor 63A is connected to a high-voltage line. The source or drain electrode pertaining to the transistor 63A to serve as an electrode not connected to the high-voltage line is connected to the source or drain electrode of the transistor 63B. The source or drain electrode pertaining to the transistor 63B as an electrode not connected to the transistor 63A is connected to the low-voltage line such as the ground line. That is to say, the source or drain electrode pertaining to the transistor 63B to serve as an electrode not connected to the low-voltage line such as the ground line is connected to the source or drain electrode pertaining to the transistor 63A to serve as an electrode not connected to the high-voltage line. The point connecting the transistor 63A to the transistor 63B is connected to the input terminal of the switch device 63C whereas the output terminal of the switch device 63C is connected to the input terminal of the comparator 63E. The switch device 63D is connected between the input terminal of the comparator 63E and the low-voltage line such as the ground line. The output terminal of the comparator 63E is the output terminal OUT of the third waveform generation circuit 63.

Figure 6A:
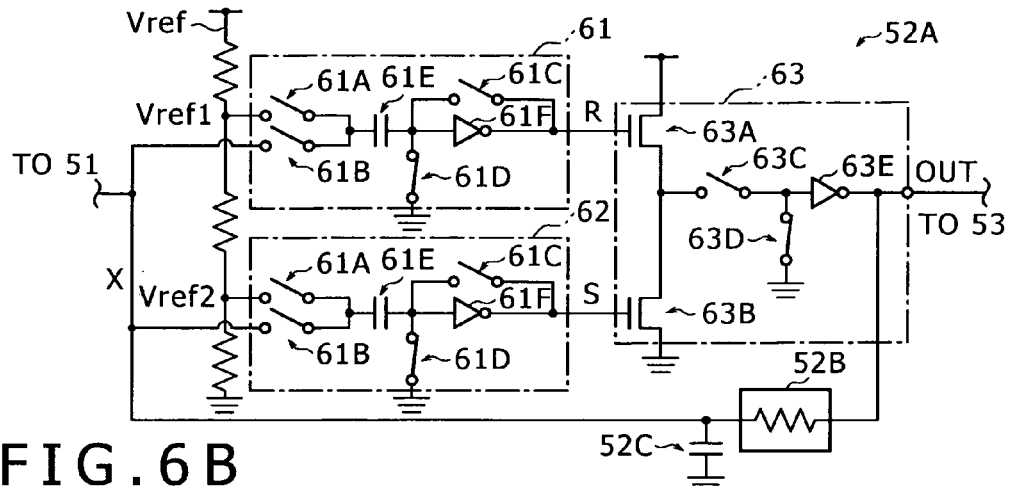
FIGS. 6A to 6C are diagrams to be referred to in description of typical operations carried out by the signal source shown in FIG. 5.
Figure 6B:
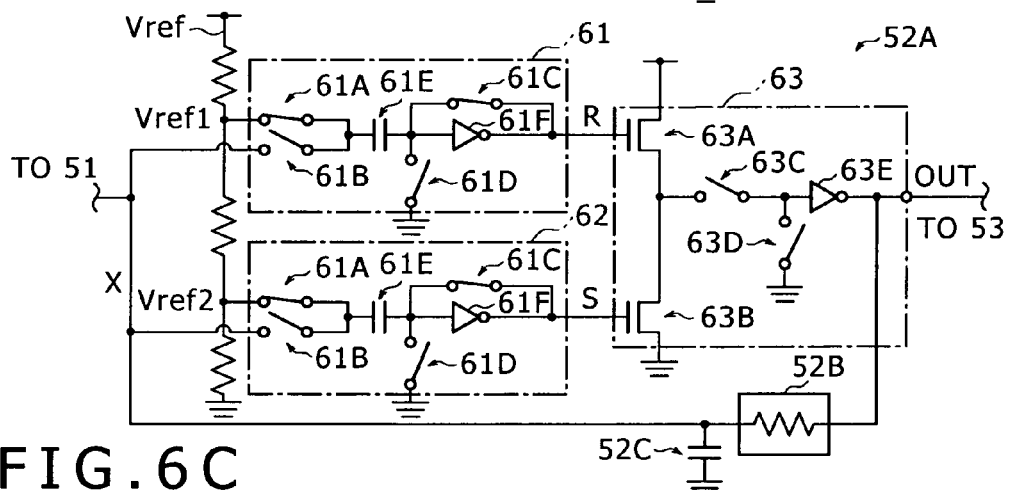
Figure 6C:
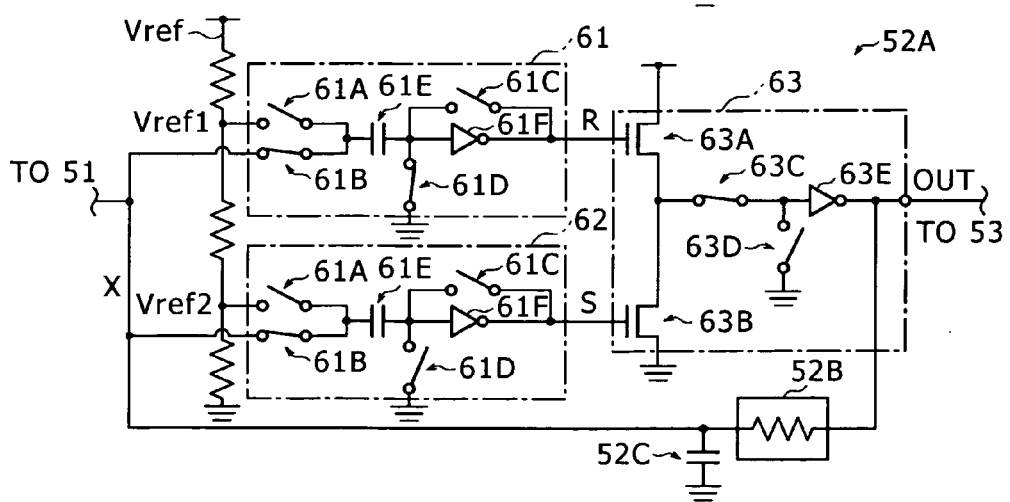

The switch devices 61A to 61D, the switch device 63C and the switch device 63D which are employed in the signal source 52A are controlled to turn on and off by control signals generated by the control section 54. As shown in FIG. 6A for example, a control signal generated by the control section 54 turns on only the switch devices 61D and 63D. At that time, the voltage of the low-voltage line such as the ground line appears at each node in the signal source 52A, putting the signal source 52A in a reset state. Then, as shown in FIG. 6B for example, a control signal generated by the control section 54 turns on only the switch devices 61A and 61C. At that time, a predetermined voltage lower than the voltage appearing on the low-voltage line appears at each node in the signal source 52A, putting the signal source 52A in a pre-charge state. Later on, as shown in FIG. 6C for example, a control signal generated by the control section 54 turns on only the switch devices 61B and 63C. At that time, the waveforms of a voltage appearing on the input terminal X of the switch device 61B, a voltage appearing on the output terminal R of the first waveform generation circuit 61 and a voltage appearing on the output terminal S of the first waveform generation circuit 63 are shown in FIGS. 7A to 7C respectively whereas the waveform of a voltage appearing on the output terminal OUT of the signal source 52A is a rectangular waveform shown in FIG. 7D.

A circuit shown in FIG. 6C and waveforms shown in FIGS. 7A to 7D are explained in detail as follows. At a time t1, when signals appearing at the output terminal OUT and the input terminal X have been set at the H level, an active signal set at the H level is supplied to the switch devices 61B and 63C to serve as a control signal, turning on the switch devices 61B and 63C. With the switch devices 61B and 63C turned on, signals appearing at the output terminals R and S are pulled down to the L level. Thus, a signal appearing at the output terminal OUT is also pulled down to the L level whereas a signal appearing at the input terminal X also changes to the L level at an RC time constant. Then, at a time t2, as the level of the signal appearing at the input terminal X starts to become lower than the level of a signal appearing at the connection point Vref1, the comparator 61F starts to respond so that the level of the signal appearing at the output terminal R changes to the H level, turning off the transistor 63A. Then, at a time t3, as the level of the signal appearing at the input terminal X further decreases and starts to become lower than the level of a signal appearing at the connection point Vref2, the comparator 61F starts to respond so that the level of the signal appearing at the output terminal S also changes to the H level. As a result, the transistor 63B is turned on so that the level of the signal appearing at the output terminal OUT changes from the L level to the H level. At that time, the level of the signal appearing at the input terminal X is driven to start increasing. As the level of the signal appearing at the input terminal X starts to exceed the level of the signal appearing at the connection point Vref2, the comparator 61F again responds. Thus, the level of the signal appearing at the output terminal S changes to the L level so that the transistor 63B is again turned off. Then, at a time t4, as the level of the signal appearing at the input terminal X further increases to exceed the level of the signal appearing at the connection point Vref1, the comparator 61F starts to respond so that the level of the signal appearing at the output terminal R also changes to the L level. Thus, the transistor 63A is turned on, causing the signal appearing on the output terminal OUT to change from the H level to the L level. At that time, as the level of the signal appearing at the input terminal X starts to decrease and starts to become lower than the level of the signal appearing at the connection point Vref1, the comparator 61F responds again so that the level of the signal appearing at the output terminal R changes to the H level, again turning off the transistor 63A. In this way, a voltage is generated at the output terminal OUT of the signal source 52A to have a rectangular waveform like one shown in FIG. 7D.

Next, the variable-resistance resistive device 52B is explained as follows. As shown in FIG. 4, the variable-resistance resistive device 52B is configured to typically have a plurality of resistive devices 52D and as many switch devices 52E as the resistive devices 52D. Each of the resistive devices 52D forms a series circuit in conjunction with one of the switch devices 52E. The series circuits are connected to each other in parallel. Each of the switch devices 52E employed in the variable-resistance resistive device 52B is controlled to turn on and off by a select signal supplied by the control section 54 in order to select any ones of the resistive devices 52D. The resistive devices 52D may have a uniform resistance or resistances different from each other.

The conversion section 53 outputs an output signal representing the frequency of an oscillation signal generated by the oscillation section 52. For example, the conversion section 53 may be designed to include a clock counter in a configuration not shown in any of the figures. In such a configuration, the clock counter measures the frequency of the oscillation signal generated by the oscillation section 52 by counting the number of oscillation signal pulses and outputs a digital output signal according to the number of oscillation signal pulses as the frequency.

It is to be noted that the conversion section 53 may also be configured to include an F-V conversion circuit and an A/D converter. The F-V conversion circuit is a circuit for converting the oscillation signal generated by the oscillation section 52 into a digital voltage according to the frequency of the oscillation signal. To put it concretely, the F-V conversion circuit converts the oscillation signal appearing at the output terminal of the oscillation section 52 into a voltage according to the frequency of the oscillation signal and supplies an analog signal representing the voltage to the A/D converter. The A/D converter then converts the analog signal supplied thereto by the F-V conversion circuit into a digital output signal.

The memory section 55 is used for storing a table not shown in any of the figures as a table used for recording information on switching of each series circuit consisting of a resistive device 52D and a switch device 52E. To put it concretely, the table is used for storing typically a plurality of threshold values for a signal output by the conversion section 53. In addition, the table is also used for storing typically a newly set index to a series circuit consisting of a resistive device 52D and a switch device 52E when the magnitude of the signal output by the conversion section 53 exceeds a threshold value, that is, when the magnitude of the signal output by the conversion section 53 becomes greater or smaller than the threshold value.

In this case, if the resistive devices 52D have a uniform resistance, an index for one or more series circuits each consisting of a resistive device 52D and a switch device 52E is assigned to the series circuits. If the resistive devices 52D have resistances different from each other, on the other hand, an index for one series circuit consisting of a resistive device 52D and a switch device 52E is assigned to the series circuit.

The output section 56 is a section for outputting information such as contact coordinates derived by the control section 54 as a detection signal 50A. The input section 57 is a section for receiving inputs such as a synchronization signal 50B and a position signal 50C. The detection signal 50A is a signal used in driving the detection circuit 50 whereas the position signal 50C is a signal showing coordinates of a functional portion such as a button shown on the image display surface 20A.

The control section 54 is a section for deriving contact coordinates of a finger or the like, the spatial position of the finger or the like or the movement of the finger or the like on the basis of a signal received from the conversion section 53 to serve as a signal representing the frequency of an oscillation signal generated by the oscillation section 52. In addition, the control section 54 is also a section for controlling the switching devices 51A and 51B included in the select section 51. The control section 54 generates a select signal used for driving the select section 51 to select only some of the detection electrodes 21H and 21V sequentially one electrode after another and supplies the select signal to the select section 51 including the switching devices 51A and 51B. To put it concretely, the control section 54 supplies an EN signal and the select signal to the switching devices 51A and 51B in order to carry out internal switching inside the switching devices 51A and 51B.

For example, at a time determined in advance, the control section 54 supplies the EN signal put in an inactive state to the changeover switching device 51A. Such an EN signal drives the changeover switching device 51A to electrically disconnect all terminals on the side of the sensor section 21 from the terminal on a side opposite to the sensor section 21. By the same token, at a time determined in advance, the control section 54 supplies the EN signal put in an inactive state to the changeover switching device 51B. Such an EN signal drives the changeover switching device 51B to electrically disconnect all terminals on the side of the sensor section 21 from the terminal on a side opposite to the sensor section 21.

In addition, for example, at a time determined in advance, the control section 54 supplies a select signal and the EN signal put in an active state to the changeover switching device 51A. Such an EN signal and the select signal drive the changeover switching device 51A to electrically connect some specific terminals on the side of the sensor section 21 to the terminal on a side opposite to the sensor section 21. The specific terminals are terminals selected by the select signal. By the same token, at a time determined in advance, the control section 54 supplies a select signal and the EN signal put in an active state to the changeover switching device 51B. Such an EN signal and the select signal drive the changeover switching device 51B to electrically connect some specific terminals on the side of the sensor section 21 to the terminal on a side opposite to the sensor section 21. The specific terminals are terminals selected by the select signal.

The control section 54 is also a section for controlling the switch devices 52E included in the oscillation section 52. To put it concretely, the control section 54 supplies a control signal to one or more aforementioned switch devices 52E in order to turn on the one or more aforementioned switch devices 52E at the same time.

For example, the control section 54 retrieves the table described before from the memory section 55 in advance. When the magnitude of the signal output by the conversion section 53 exceeds a threshold value recorded in the table, that is, when the magnitude of the signal output by the conversion section 53 becomes greater or smaller than the threshold value, only one or more aforementioned switch devices 52E corresponding to an index recorded in the table are turned on. In this way, the control section 54 is thus capable of changing the frequency of an oscillation signal generated by the oscillation section 52. That is to say, in accordance with a signal output by the conversion section 53, the control section 54 changes the frequency of an oscillation signal generated by the oscillation section 52.

In this case, if the resistive devices 52D have a uniform resistance, the control section 54 turns on only one or more series circuits each consisting of a resistive device 52D and a switch device 52E which are associated with the index. If the resistive devices 52D have resistances different from each other, on the other hand, the control section 54 turns on only one series circuit consisting of a resistive device 52D and a switch device 52E which are associated with the index.

Next, the following description explains typical operations carried out by the position detection apparatus 2 according to this embodiment.

Whole Operations

First of all, for example, at the power-on time of the display apparatus 1 or at the activation time of the position detection apparatus 2, the control section 54 controls the position detection apparatus 2 to start operations. To begin with, the control section 54 supplies the EN signal put in an active state and the select signal to the changeover switching device 51A or the changeover switching device 51B. The select signal is used for selecting one or more horizontal detection electrodes 21H and one or more vertical detection electrodes 21V. Thus, the one or more horizontal detection electrodes 21H selected by the select signal and the one or more horizontal detection electrodes 21V selected by the select signal are connected to the conversion section 53 through the oscillation section 52. If a finger or the like has been brought into contact with the image display surface 20A or brought to a position in close proximity to the image display surface 20A at that time, the finger or the like brought into contact with the image display surface 20A or brought to a position in close proximity to the image display surface 20A has caused a change of the electrostatic capacitance in the one or more horizontal detection electrodes 21H and the one or more horizontal detection electrodes 21V. This change of the electrostatic capacitance is detected by the conversion section 53 as a change of the frequency of the signal generated by the oscillation section 52. The frequency (or the change of the frequency) detected by the conversion section 53 is supplied to the control section 54 and, on the basis of information on the frequency (or the change of the frequency) detected by the conversion section 53, the control section 54 derives the contact coordinates of the finger or the like, the spatial position of the finger or the like or the movement of the finger or the like. The control section 54 then supplies information on the detected contact coordinates of the finger or the like, the detected spatial position of the finger or the like or the detected movement of the finger or the like to the output section 56. Finally, the output section 56 outputs the information received from the control section 54 to an external recipient as the detection signal 50A.

In addition, before outputting the select signal to the changeover switching device 51A or the changeover switching device 51B, the control section 54 retrieves the table described earlier from the memory section 55 in advance. Then, when the magnitude of the signal output by the conversion section 53 exceeds a threshold value recorded in the table, that is, when the magnitude of the signal output by the conversion section 53 becomes greater or smaller than the threshold value, one or more aforementioned switch devices 52E corresponding to an index recorded in the table are turned on. In this way, the control section 54 is thus capable of changing the frequency of an oscillation signal generated by the oscillation section 52. If the finger or the like has been detected at a position far away from the surface of the touch panel for example, the control section 54 increases the value at which the frequency applied to the detection electrodes 21H and 21V is set and, if the finger or the like has been detected at a position in close proximity to the surface of the touch panel, on the other hand, the control section 54 decreases the value at which the frequency applied to the detection electrodes 21H and 21V is set.

Effects

In this embodiment, a table retrieved from the memory section 55 is used to adjust the frequency of a signal generated by the oscillation section 52 in accordance with the position of a detected finger or the like. Thus, in the case of a finger or the like placed at a position at which the finger or the like can be detected without increasing the frequency of an oscillation signal generated by the oscillation section 52, the power consumption can be reduced. As a result, the amount of power consumed wastefully can be decreased.

3: Second Embodiment

FIG. 8 is a diagram showing a typical approximate configuration of a display apparatus 3 according to a second embodiment of the present disclosure. The display apparatus 3 is a display apparatus including a touch sensor and a proximity sensor which have the electrostatic capacitance type. The display apparatus 3 employs typically a liquid-crystal display device as its display device. In addition, the touch sensor and the proximity sensor are provided on the surface of the liquid-crystal display device, being integrated with the liquid-crystal display device. Since the display apparatus 3 includes a position detection apparatus having a configuration identical with the position detection apparatus 2 according to the embodiment described so far or a modified version, the display apparatus 3 can be said to have the same configuration as the display apparatus 1 according to the embodiment described so far or the modified version.

As shown in FIG. 8, the display apparatus 3 typically employs a touch-sensor-having liquid-crystal panel 60, a backlight 30, a peripheral circuit 40 and a detection circuit 50. The backlight 30 is provided behind the touch-sensor-having liquid-crystal panel 60 which is a liquid-crystal panel having a touch sensor.

Touch-Sensor-Having Liquid-Crystal Panel 60

The touch-sensor-having liquid-crystal panel 60 displays a video image on an image display surface 60A of the display apparatus 3. The image display surface 60A is the surface of the touch-sensor-having liquid-crystal panel 60. In addition, when the finger or the like touches the image display surface 60A of the display apparatus 3 (or the surface of the touch-sensor-having liquid-crystal panel 60), the finger or the like approaches the image display surface 60A or the finger or the like moves over the image display surface 60A, the touch-sensor-having liquid-crystal panel 60 also inputs information on the position (or the movement) of the finger or the like. The touch-sensor-having liquid-crystal panel 60 detects a state of contact/noncontact with an XY matrix, a spatial position separated away from the matrix and a movement over the matrix.

Figure 9:
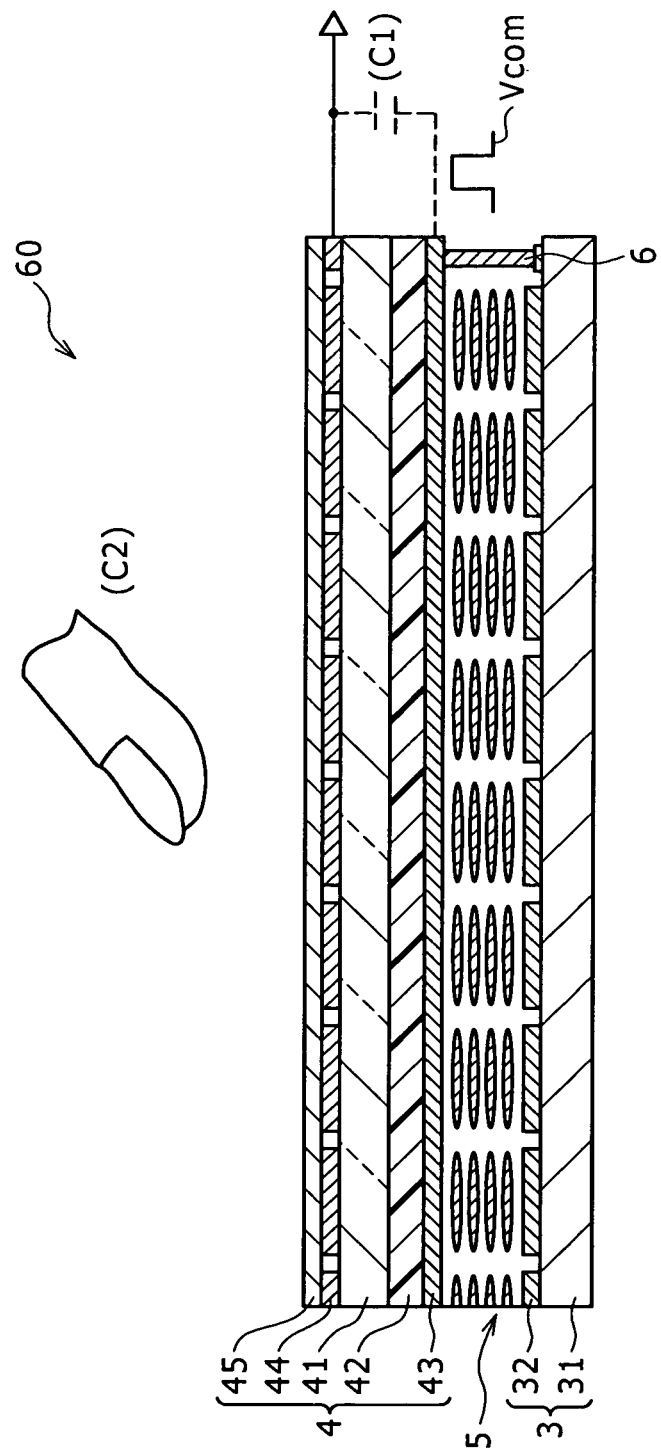
FIG. 9 is a cross-sectional diagram showing a typical configuration of a liquid-crystal display panel employed in the display apparatus shown in FIG. 8 as a display panel having touch sensors.

FIG. 9 is a cross-sectional diagram showing a typical configuration of necessary components employed in the touch-sensor-having liquid-crystal panel 60. The touch-sensor-having liquid-crystal panel 60 has a configuration including an electrostatic capacitance touch sensor. In the configuration, the detection electrodes 21H and 21V are also used as some electrodes originally provided in the liquid-crystal display panel whereas the signal output by the oscillation section 52 is also used as a display driving signal. The electrodes originally provided in the liquid-crystal display panel is a common electrode 43 to be described later whereas the display driving signal is a common driving signal Vcom also to be described later. The touch-sensor-having liquid-crystal panel 60 has a liquid-crystal layer 5 provided between a pixel substrate 7 and a facing substrate 4 placed to face the pixel substrate 7.

The pixel substrate 7 has a TFT substrate 31 serving as a circuit substrate and a plurality of pixel electrodes 32 laid out on the TFT substrate 31 to form a matrix. On the TFT substrate 31, a display driver not shown in the figure, TFTs (Thin Film Transistors), source lines and gate lines are created. The display driver is a section for driving the pixel electrodes 32. The source line is a line for supplying an image signal to a pixel electrode 32 whereas the gate line is a line driving a TFT.

The facing substrate 4 has a glass substrate 41, a color filter 42 and a common electrode 43. The color filter 42 is a filter created on one surface of the glass substrate 41. The common electrode 43 is an electrode created on the color filter 42. The color filter 42 is configured as a laminated stack of color-filter layers piled up repeatedly. The color-filter layers are an R (red) color filter layer, a G (green) color filter layer and a B (blue) color filter layer. Every display pixel (or every pixel electrode 32) is associated with a set of filter layers for three colors, that is, the R, G and B colors. The common electrode 43 is also used as a sensor driving electrode forming a portion of the touch sensor for carrying out a touch detecting operation.

The common electrode 43 is linked to the TFT substrate 31 by a contact conduction pillar 6. The common driving signal Vcom having an AC rectangular waveform is applied from the TFT substrate 31 to the common electrode 43 through the contact conduction pillar 6. The common driving signal Vcom is a signal for determining a display voltage of every pixel in conjunction with a pixel voltage applied to the pixel electrode 32. However, the common driving signal Vcom can also be used as a signal for driving the touch sensor. That is to say, the polarity of the common driving signal Vcom is inverted once every period determined in advance.

On the other surface of the glass substrate 41, a sensor detection electrode 44 is created. In addition, on the sensor detection electrode 44, a polarization plate 45 is provided. The sensor detection electrode 44 forms a portion of the touch sensor. The liquid-crystal layer 5 is a layer for modulating light, which is passing through the plate, in accordance with the state of an electric field. A liquid crystal of a variety of modes is used as the liquid-crystal layer 5. The modes include the TN (Twist Nematic) mode, the VA (Vertical Alignment) mode and ECB (Electric-field Control Birefringence) mode. In the typical configuration shown in FIG. 9, a capacitive device C1 is an electrostatic-capacitance device created between the common electrode 43 and one sensor detection electrode 44.

Effects

The layout of the detection electrodes 21H and 21V employed in the sensor section 21 in this second embodiment is different from that for the first embodiment described before. However, this second embodiment is identical with the first embodiment described before in that the frequency of a signal generated by the oscillation section 52 is adjusted in accordance with the position of a detected finger or the like by making use of a table retrieved from the memory section 55. Thus, also in the case of this second embodiment, for a finger or the like placed at a position at which the finger or the like can be detected without increasing the frequency of an oscillation signal generated by the oscillation section 52, the power consumption can be reduced. As a result, the amount of power used wastefully can be decreased.

4: Modifications

The present disclosure has been explained so far by describing embodiments and modifications of the embodiments. However, implementations of the present disclosure are by no means limited to the embodiments and the modifications of the embodiments. That is to say, a variety of further changes can be made to the embodiments and the modifications of the embodiments.

Figure 10:
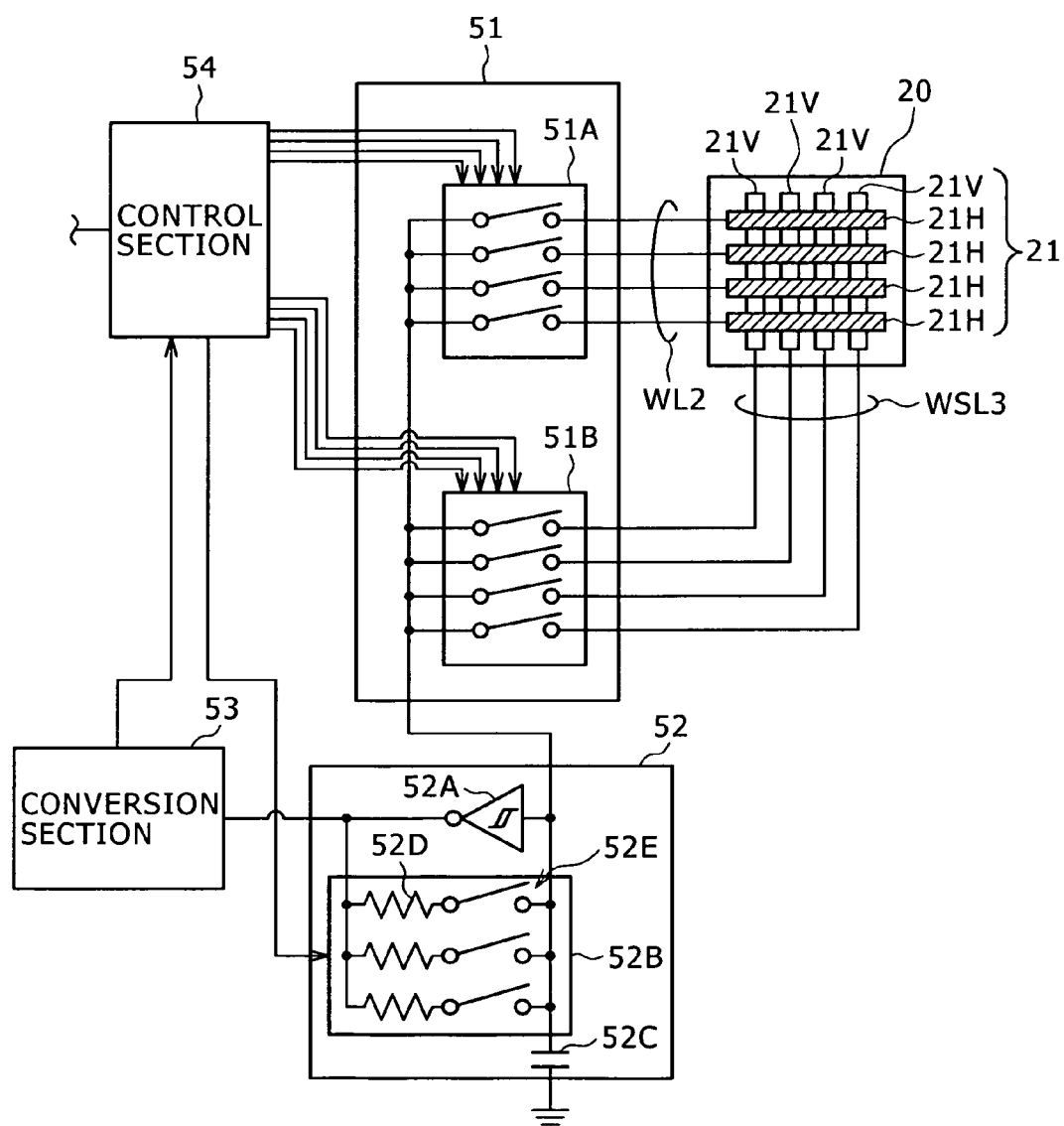
FIG. 10 is a diagram showing another typical internal configuration of the position detection apparatus shown in FIG. 4.

For example, in the case of the embodiments and the modifications of the embodiments, the changeover switch devices 51A and 51B are each a multiplexer. However, as shown in FIG. 10 for example, a plurality of switches are connected in parallel to each other. In such a configuration, in place of the EN signal and the select signal which are supplied to the changeover switching devices 51A and 51B, the control section 54 needs to supply an on/off control signal to every switch in the changeover switching devices 51A and 51B.

Figure 11:
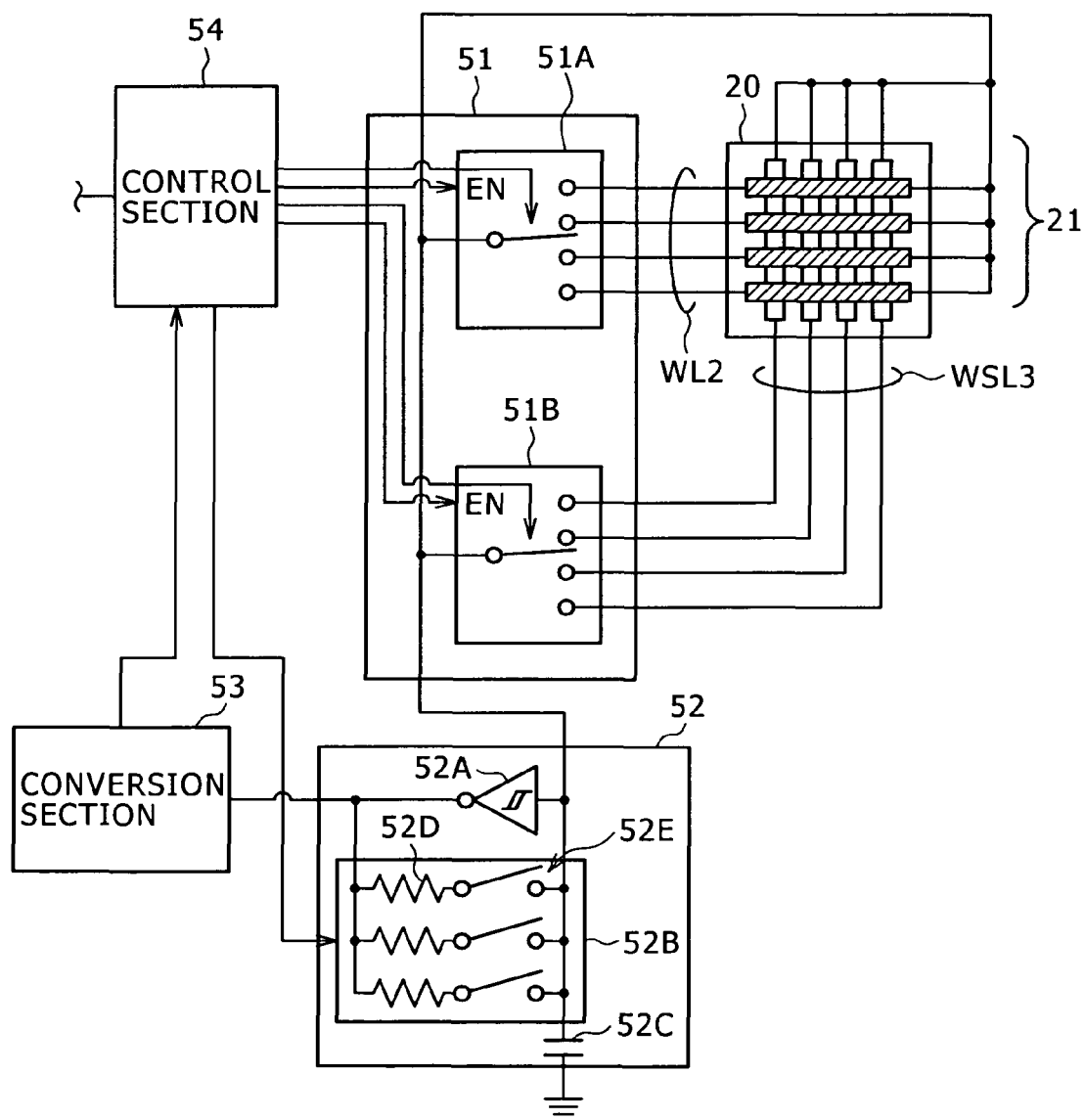
FIG. 11 is a diagram showing a further typical internal configuration of the position detection apparatus shown in FIG. 4.
Figure 12:
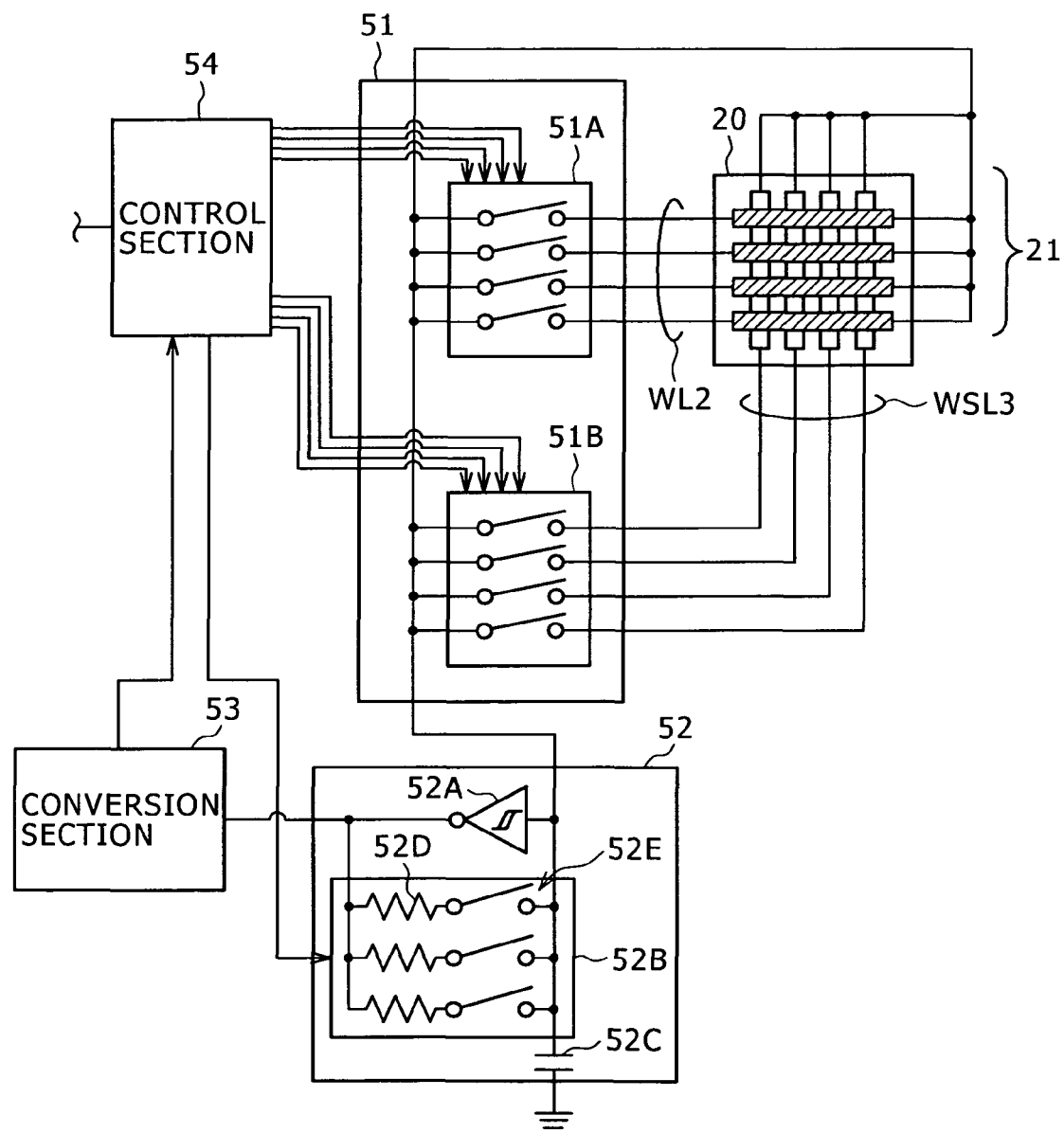
FIG. 12 is a diagram showing another typical internal configuration of the position detection apparatus shown in FIG. 10.

In addition, in the case of the embodiments and the modifications of the embodiments, the signal output by the oscillation section 52 is supplied to only terminals on one side of each of the detection electrodes 21H and 21V. For example, as shown in FIGS. 11 and 12, however, the signal output by the oscillation section 52 can also be supplied to terminals on both sides of each of the detection electrodes 21H and 21V. In such a configuration, it is desirable to directly connect the oscillation section 52 to the terminals on the other side of each of the detection electrodes 21H and 21V without making use of switch devices or the like. In addition, in the configurations shown in FIGS. 11 and 12, if necessary, an amplifier can be provided between the terminals on the other side of each of the detection electrodes 21H and 21V and the oscillation section 52. Not shown in any of the figures, the amplifier is an amplifier for amplifying the signal generated by the oscillation section 52.

On top of that, in the case of the embodiments described so far and the modifications of the embodiments, a transmission-type device is used as the liquid-crystal display device. However, a device of a type other than the type of the transmission-type device can also be used as the liquid-crystal display device. For example, a reflection-type device can also be used as the liquid-crystal display device. In this case, however, it is necessary to eliminate the backlight 30 serving as a light source or provide the backlight 30 on the upper-surface side of the liquid-crystal display device.

In addition, in the case of the embodiments described so far and the modifications of the embodiments, the present disclosure is applied to a display apparatus in which a liquid-crystal display device is used as a display device. However, the present disclosure can also be applied to a display apparatus in which a display device having a type other than the liquid-crystal display device is used. A typical example of the display device having a type other than the liquid-crystal display device is an organic EL device.

On top of that, in the case of the embodiments described so far and the modifications of the embodiments, the series of processes described previously can be carried out by hardware and/or execution of software. If the series of processes described above is carried out by execution of software, programs composing the software can be installed into a general-purpose computer or the like from typically a network or a removable recording medium. In this case, the computer or the like serves as the display apparatus. Instead of installing the programs, the programs can also be stored in advance in a storage section embedded in the computer.

5: Typical Host Apparatus

The following description explains electronic apparatus each serving as a host apparatus employing the display apparatus 1 or 3 according to respectively the first or second embodiment of the present disclosure. The display apparatus 1 or 3 according to respectively the first or second embodiment of the present disclosure can be used as the display apparatus of an electronic apparatus in all fields. In the electronic apparatus, a video signal supplied from an external source or generated internally is displayed as an image or a video. Typical examples of the electronic apparatus are a TV set, a digital camera, a notebook personal computer, a portable terminal apparatus such as a hand phone and a video camera.

First Typical Host Apparatus

Figure 13:
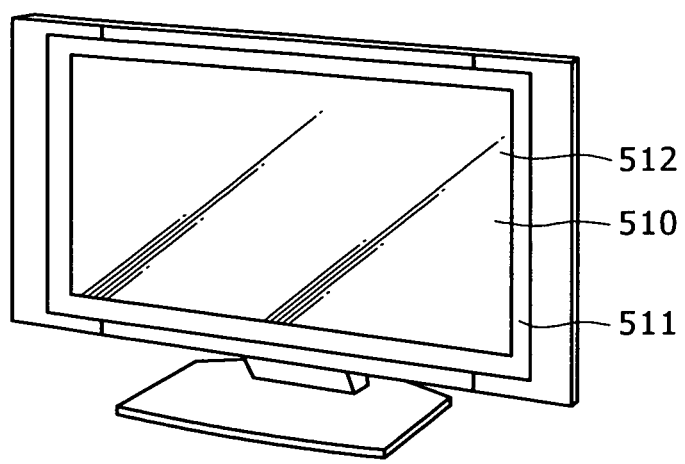
FIG. 13 is a perspective diagram showing an external appearance of a first typical host apparatus in which the display apparatus according to the embodiments or the like is employed.

FIG. 13 is a perspective diagram showing an external appearance of a TV set serving as a first typical host apparatus in which the display apparatus 1 or 3 according to the first or second embodiment respectively or the like is employed. The TV set typically has a front panel 511 and an image display screen section 510 including a filter glass 512. The image display screen section 510 is configured to include the display apparatus 1 or 3 according to the first or second embodiment respectively or the like.

Second Typical Host Apparatus

Figure 14A:
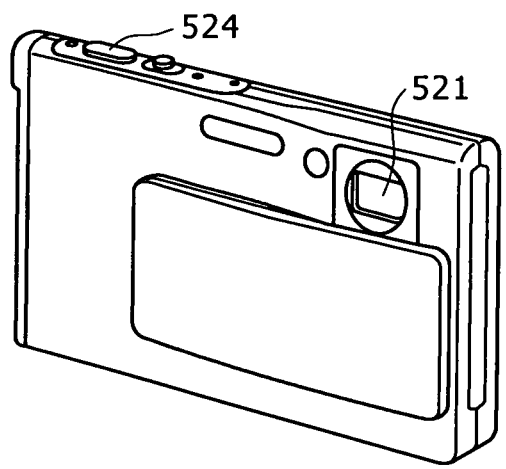
FIG. 14A is a perspective diagram showing an appearance seen from the front-view side of a second typical host apparatus in which the display apparatus according to the embodiments or the like is employed as an external appearance of the second typical host apparatus.
Figure 14B:
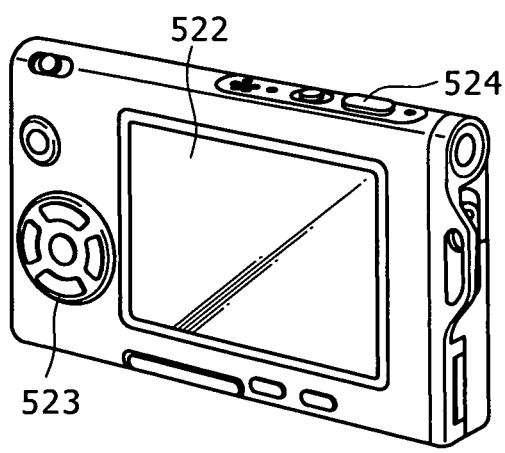
FIG. 14B is a perspective diagram showing an appearance seen from the rear-view side of the second typical host apparatus as an external appearance of the second typical host apparatus.

FIGS. 14A and 14B is perspective diagrams showing external appearance of a digital camera serving as a second typical host apparatus in which the display apparatus 1 or 3 according to the first or second embodiment respectively or the like is employed. The digital camera typically has a flash light emitting section 521, a display section 522, a menu switch 523 and a shutter button 524. The display section 522 is configured to include the display apparatus 1 or 3 according to the first or second embodiment respectively or the like.

Third Typical Host Apparatus

Figure 15:
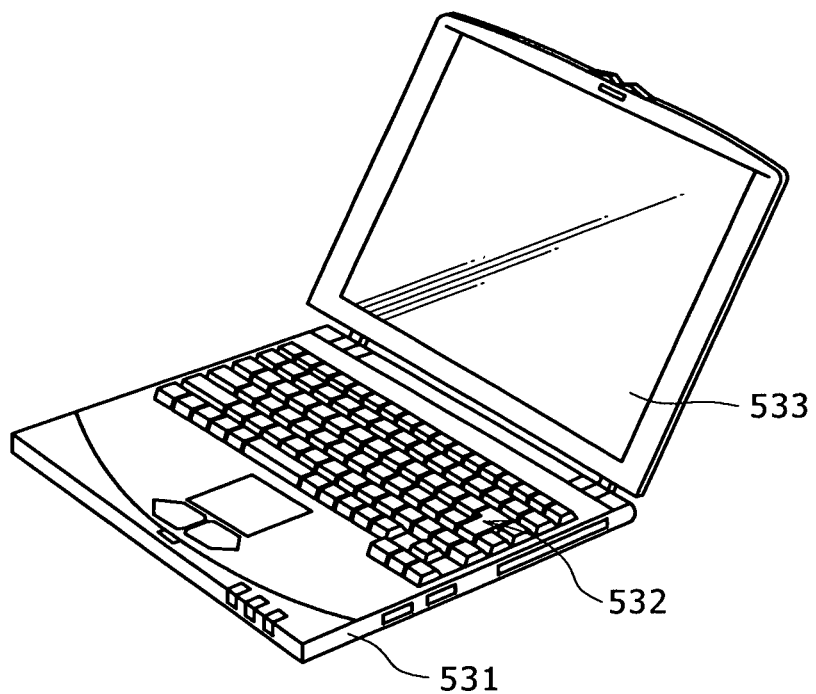
FIG. 15 is a perspective diagram showing an external appearance of a third typical host apparatus in which the display apparatus according to the embodiments or the like is employed.

FIG. 15 is a perspective diagram showing an external appearance of a notebook personal computer serving as a third typical host apparatus in which the display apparatus 1 or 3 according to the first or second embodiment respectively or the like is employed. The notebook personal computer typically has a main body 531, a keyboard 532 for receiving characters and the like entered in an input operation and a display section 533. The display section 533 is configured to include the display apparatus 1 or 3 according to the first or second embodiment respectively or the like.

Fourth Typical Host Apparatus

Figure 16:
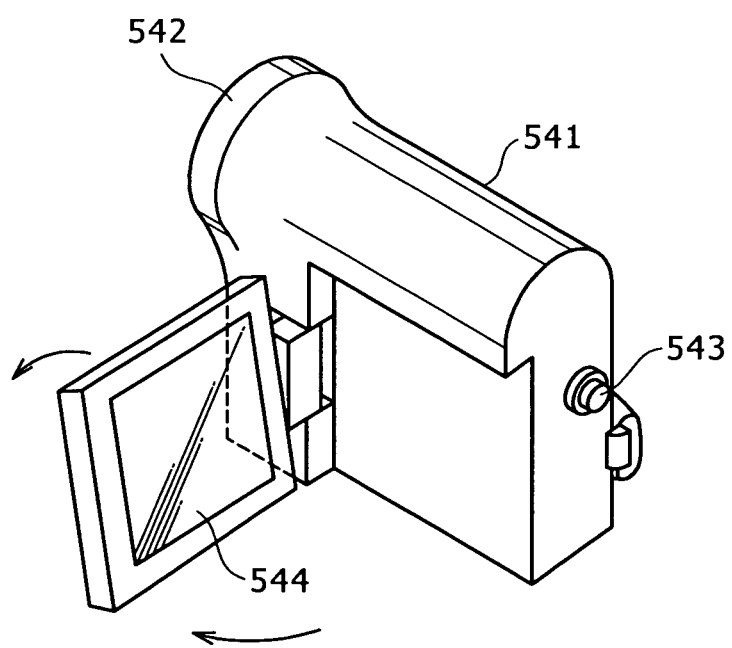
FIG. 16 is a perspective diagram showing an external appearance of a fourth typical host apparatus in which the display apparatus according to the embodiments or the like is employed.

FIG. 16 is a perspective diagram showing an external appearance of a video camera serving as a fourth typical host apparatus in which the display apparatus 1 or 3 according to the first or second embodiment respectively or the like is employed. The video camera typically has a main body 541, a photographing-object lens 542 provided on the front-side surface of the main body 541, a photographing start/stop switch 543 and a display section 544. The display section 544 is configured to include the display apparatus 1 or 3 according to the first or second embodiment respectively or the like.

Fifth Typical Host Apparatus

FIG. 17 is a perspective diagram showing an external appearance of a hand phone serving as a fifth typical host apparatus in which the display apparatus 1 or 3 according to the first or second embodiment respectively or the like is employed. The hand phone typically has an upper case 710, a lower case 720, a link section (or a hinge section) 730 for joining the upper case 710 and the lower case 720 to each other, a display section 740, a sub-display section 750, a picture light 760 and a camera 770. The display section 740 or the sub-display section 750 is configured to include the display apparatus 1 or 3 according to the first or second embodiment respectively or the like.

The present disclosure contains subject matter related to that disclosed in Japanese Priority Patent Application JP 2010-185132 filed in the Japan Patent Office on Aug. 20, 2010, the entire content of which is hereby incorporated by reference.

It should be understood by those skilled in the art that various modifications, combinations, sub-combinations and alterations may occur depending on design requirements and other factors in so far as they are within the scope of the appended claims or the equivalents thereof.

What is claimed is:

1. A position detection apparatus comprising:
a sensor section having a plurality of detection electrodes laid out on a detection surface;
a select section configured to select one or more detection electrodes from said detection electrodes;
an oscillation section having an oscillation frequency determined by a capacitance generated in said one or more detection electrodes selected by said select section;
a conversion section configured to output an output signal representing a frequency of an oscillation signal generated by said oscillation section; and
a control section configured to change said frequency of the oscillation signal generated by said oscillation section in accordance with said output signal output by said conversion section, when an object has been brought into contact with the detection surface or brought into a position in close proximity to the detection surface,
wherein said oscillation section converts the oscillation frequency on the basis of spatial position information derived by the control section,
wherein said control section changes said frequency of said oscillation signal generated by said oscillation section when said output signal output by said conversion section exceeds a threshold value,
wherein said oscillation section has a signal source and a variable-resistance resistor connected in parallel to said signal source, and
wherein said control section outputs a control signal to said variable-resistance resistor in order to change the resistance of said variable-resistance resistor according to a table described before from a memory section so as to change said frequency of said oscillation signal generated by said oscillation section.

2. A display apparatus comprising:
a display panel configured to display an image on a display screen on the basis of a video signal;
a sensor section having a plurality of detection electrodes laid out on said display surface;
a select section configured to select one or more detection electrodes from said detection electrodes;
an oscillation section having an oscillation frequency determined by a capacitance generated in said one or more detection electrodes selected by said select section;
a conversion section configured to output an output signal representing the frequency of an oscillation signal generated by said oscillation section; and
a control section configured to change said frequency of said oscillation signal generated by said oscillation section in accordance with said output signal output by said conversion section, when an object has been brought into contact with the detection surface or brought into a position in close proximity to the detection surface, wherein said control section changes said frequency of said oscillation signal generated by said oscillation section when said output signal output by said conversion section exceeds a threshold value, wherein said oscillation section has a signal source and a variable-resistance resistor connected in parallel to said signal source, and wherein said control section outputs a control signal to said variable-resistance resistor in order to change the resistance of said variable-resistance resistor according to a table described before from a memory section so as to change said frequency of said oscillation signal generated by said oscillation section.

3. An electronic apparatus having a display apparatus comprising:

a display panel configured to display an image on a display screen on the basis of a video signal;

a sensor section having a plurality of detection electrodes laid out on said display surface;

a select section configured to select one or more detection electrodes from said detection electrodes;

an oscillation section having an oscillation frequency determined by a capacitance generated in said one or more detection electrodes selected by said select section;

a conversion section configured to output an output signal representing the frequency of an oscillation signal generated by said oscillation section; and a control section configured to change said frequency of said oscillation signal generated by said oscillation section in accordance with said output signal output by said conversion section, when an object has been brought into contact with the detection surface or brought into a position in close proximity to the detection surface, wherein said control section changes said frequency of said oscillation signal generated by said oscillation section when said output signal output by said conversion section exceeds a threshold value, wherein said oscillation section has a signal source and a variable-resistance resistor connected in parallel to said signal source, and wherein said control section outputs a control signal to said variable-resistance resistor in order to change the resistance of said variable-resistance resistor according to a table described before from a memory section so as to change said frequency of said oscillation signal generated by said oscillation section.

* * * * *